(12) United States Patent
Koue

(10) Patent No.: US 9,781,279 B2
(45) Date of Patent: Oct. 3, 2017

(54) NON-TRANSITORY COMPUTER READABLE MEDIUM, IMAGE PROCESSING APPARATUS, AND IMAGE PROCESSING METHOD

(71) Applicant: FUJI XEROX CO., LTD., Tokyo (JP)

(72) Inventor: Toshiaki Koue, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/594,802

(22) Filed: Jan. 12, 2015

(65) Prior Publication Data

US 2016/0080586 A1 Mar. 17, 2016

(30) Foreign Application Priority Data

Sep. 11, 2014 (JP) .................................. 2014-184848

(51) Int. Cl.
*H04N 1/00* (2006.01)
*H04N 1/04* (2006.01)

(52) U.S. Cl.
CPC ........... *H04N 1/00209* (2013.01); *H04N 1/04* (2013.01)

(58) Field of Classification Search
CPC .............................. H04N 1/00209; H04N 1/04
USPC .................. 358/448, 1.15, 1.9, 1.14, 402
See application file for complete search history.

(56) References Cited

U.S. PATENT DOCUMENTS

| | | | | |
|---|---|---|---|---|
| 5,438,433 A | * | 8/1995 | Reifman | ............ H04N 1/00474 358/400 |
| 8,218,197 B2 | | 7/2012 | Chiba et al. | |
| 8,488,155 B2 | * | 7/2013 | Maruyama et al. | ......... 358/1.15 |
| 2006/0092459 A1 | * | 5/2006 | Kimura | ................ B65H 37/007 358/1.15 |
| 2008/0043289 A1 | * | 2/2008 | Cranitch | ............ H04N 1/00209 358/402 |
| 2011/0002014 A1 | * | 1/2011 | Tani | ................... H04N 1/00244 358/403 |

FOREIGN PATENT DOCUMENTS

JP 2009-116789 A 5/2009
JP 2010-016770 A 1/2010

* cited by examiner

*Primary Examiner* — Quang N Vo
(74) *Attorney, Agent, or Firm* — Sughrue Mion, PLLC

(57) ABSTRACT

A non-transitory computer readable medium stores a program causing a computer to execute a process for image processing. The process includes performing preview display processing on a piece of content of document-image information generated by optically scanning a document by using one reading setting, the preview display processing being performed by using multiple transmission settings that are different from the one reading setting; and generating new image information in a case where one of pieces of content of the document-image information each of which results from the preview display processing performed by using a corresponding one of the multiple transmission settings is selected, the new image information being generated from the document-image information by using one of the transmission settings that corresponds to the selected piece of content.

9 Claims, 6 Drawing Sheets

NON-TRANSITORY COMPUTER READABLE MEDIUM, IMAGE PROCESSING APPARATUS, AND IMAGE PROCESSING METHOD

CROSS-REFERENCE TO RELATED APPLICATIONS

This application is based on and claims priority under 35 USC 119 from Japanese Patent Application No. 2014-184848 filed Sep. 11, 2014.

BACKGROUND

Technical Field

The present invention relates to a non-transitory computer readable medium, an image processing apparatus, and an image processing method.

SUMMARY

According to an aspect of the invention, there is provided a non-transitory computer readable medium storing a program causing a computer to execute a process for image processing. The process includes performing preview display processing on a piece of content of document-image information generated by optically scanning a document by using one reading setting, the preview display processing being performed by using multiple transmission settings that are different from the one reading setting; and generating new image information in a case where one of pieces of content of the document-image information each of which results from the preview display processing performed by using a corresponding one of the multiple transmission settings is selected, the new image information being generated from the document-image information by using one of the transmission settings that corresponds to the selected piece of content.

BRIEF DESCRIPTION OF THE DRAWINGS

Exemplary embodiments of the present invention will be described in detail based on the following figures, wherein.

DETAILED DESCRIPTION

Exemplary Embodiment

Configuration of Communication System

Figure 1:
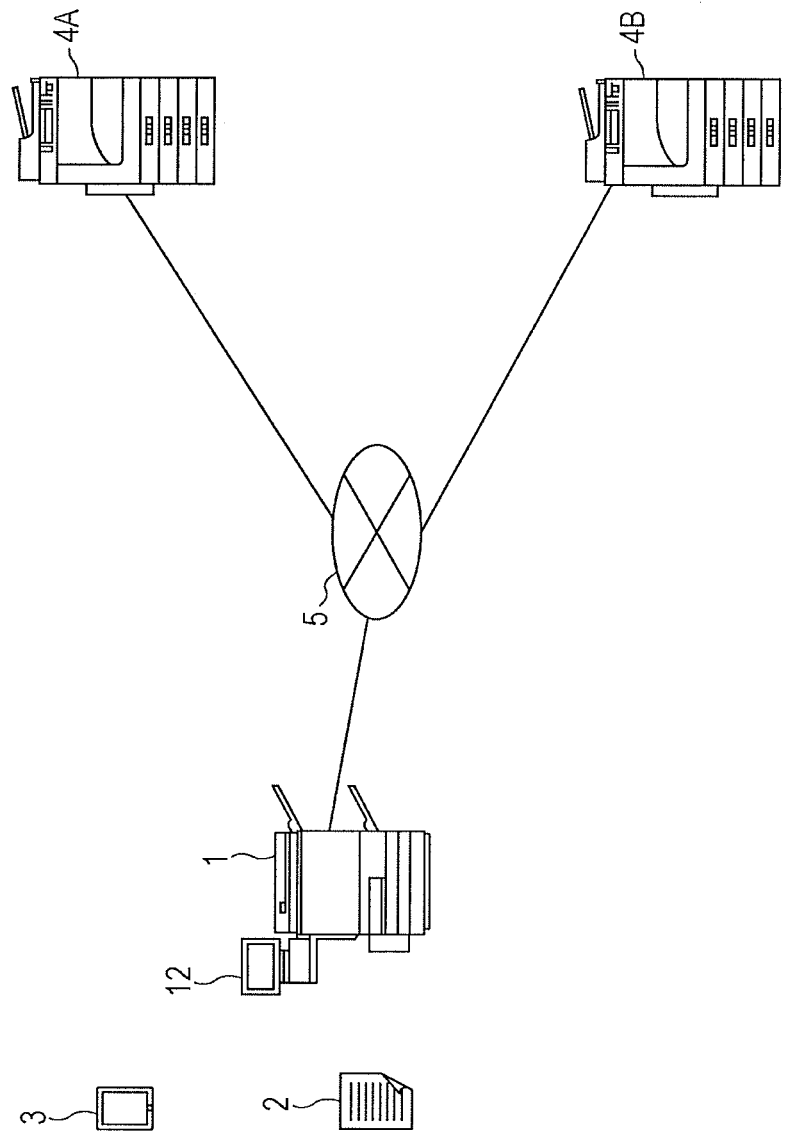
FIG. 1 is a schematic diagram illustrating an example of a configuration of a communication system according to an exemplary embodiment of the present invention.

FIG. 1 is a schematic diagram illustrating an example of a configuration of a communication system according to an exemplary embodiment of the present invention.

In the communication system, an image processing apparatus 1 is connected to external image processing apparatuses 4A and 4B for communication through a network 5 that is, for example, a public network. The image processing apparatus 1 and the external image processing apparatuses 4A and 4B exchange information with one another by using, for example, a facsimile (hereinafter, referred to as a "FAX") system.

The image processing apparatus 1 is an apparatus having a FAX-transmission/reception function and functions of a printer, a scanner, and a copier, and includes a central processing unit (CPU) having a function of processing information and electronic components such as a flash memory. In the image processing apparatus 1, an optical scanning unit 14 reads a document 2, a display 12 displays a result of reading the document 2, and a FAX communication unit 16 performs FAX transmission.

A tablet terminal 3 communicates with the image processing apparatus 1, for example, wirelessly. The tablet terminal 3 displays the result of reading the document 2 by the optical scanning unit 14 of the image processing apparatus 1, and controls the image processing apparatus 1 to perform the FAX transmission of the read image of the document 2.

The image processing apparatuses 4A and 4B need at least a FAX-transmission/reception function. The image processing apparatuses 4A and 4B receive information transmitted from the image processing apparatus 1, and print or display the information. The image processing apparatuses 4A and 4B are each, for example, a printer, but may be a personal computer (PC), a tablet terminal, a mobile phone, or another device that receives and displays information transmitted from the image processing apparatus 1.

The network 5 is, for example, a toll communication network provided by a telecommunication corporation, and is an external network such as a public switched telephone network (PSTN) or an Internet Protocol (IP) communication network.

Figure 2:
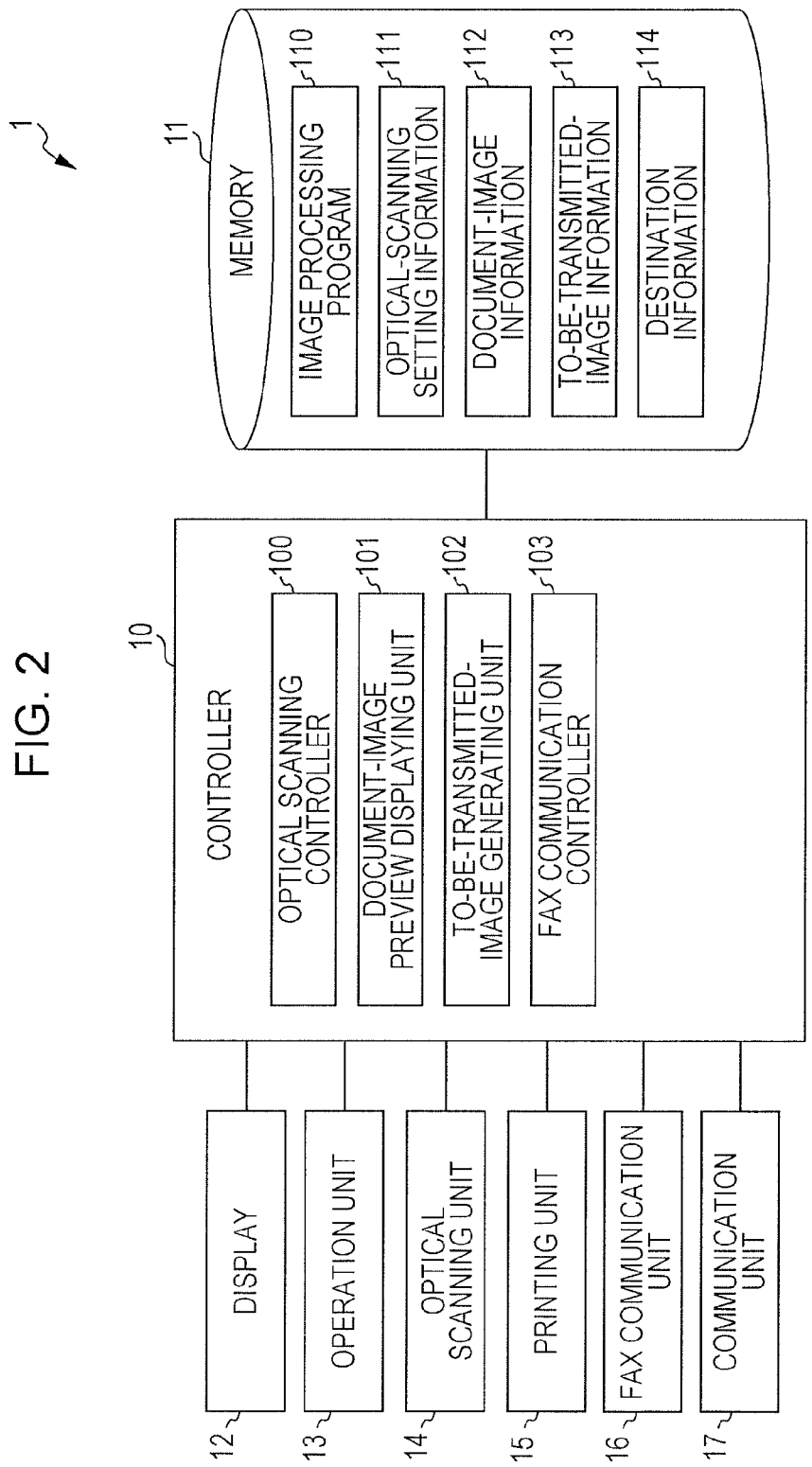
FIG. 2 is a block diagram illustrating an example of a configuration of an image processing apparatus.

FIG. 2 is a block diagram illustrating an example of a configuration of the image processing apparatus 1.

The image processing apparatus 1 includes a controller 10, a memory 11, the display 12, an operation unit 13, the optical scanning unit 14, a printing unit 15, the FAX communication unit 16, and a communication unit 17. The controller 10 includes a CPU, or the like, controls various components, and executes various programs. The memory 11 includes a storage medium such as a flash memory, and is used to store information. The display 12 displays characters, images, and the like. The operation unit 13 is provided for operating the image processing apparatus 1. The optical scanning unit 14 optically scans a sheet on which characters, images, and the like have been written. The printing unit 15 executes printing on a sheet. The FAX communication unit 16 communicates with external apparatuses through the network 5 by using a FAX system. The communication unit 17 communicates with external apparatuses, for example, wirelessly.

The controller 10 executes an image processing program 110 (described later) and thus functions as multiple units such as an optical-scanning controller 100, a document-image preview displaying unit 101, a to-be-transmitted-image generating unit 102, and a FAX communication controller 103.

The optical-scanning controller 100 sets document reading settings such as resolution, size, and color/black-and-white settings for the optical scanning unit 14 on the basis of optical-scanning setting information 111. The optical-scanning controller 100 controls the optical scanning unit 14 to read the document 2.

The document-image preview displaying unit 101 generates multiple types of preview images from document-image information 112 generated as a result of reading the document 2 with the optical scanning unit 14, the preview images each having different transmission settings such as resolution, size, and color/black-and-white settings. The document-image preview displaying unit 101 performs display processing on the preview images and displays the preview images on the display 12.

The to-be-transmitted-image generating unit 102 receives, through the operation unit 13, an operation of selecting one of the multiple types of preview images that are displayed on the display 12 by the document-image preview displaying unit 101. The to-be-transmitted-image generating unit 102 generates to-be-transmitted-image information 113 as new image information from the document-image information 112, on the basis of the transmission settings of the selected preview image.

The FAX communication controller 103 controls the FAX communication unit 16 to transmit the to-be-transmitted-image information 113 to a destination in destination information 114 or to a destination inputted by a user through the operation unit 13.

The memory 11 is used to store the image processing program 110, the optical-scanning setting information 111, the document-image information 112, the to-be-transmitted-image information 113, the destination information 114, and the like. The image processing program 110 causes the controller 10 to operate as the optical-scanning controller 100, the document-image preview displaying unit 101, the to-be-transmitted-image generating unit 102, and the FAX communication controller 103 that are described above.

Operation of Image Processing Apparatus

Hereinafter, (1) a basic operation, (2) a preview operation, and (3) a FAX Transmission operation of the image processing apparatus 1 according to the exemplary embodiment will be described with reference to FIGS. 1 to 3, and FIG. 6.

(1) Basic Operation

Figure 6:
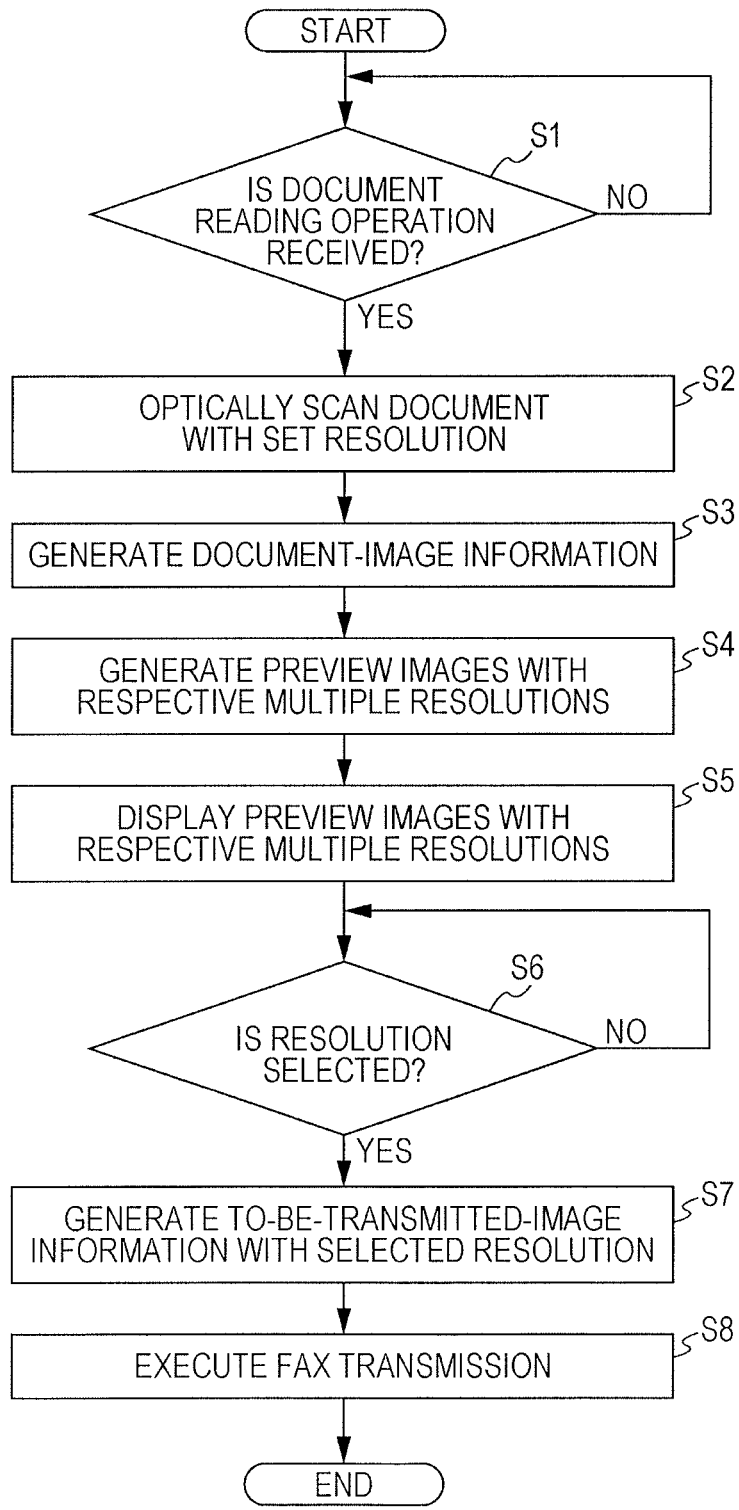
FIG. 6 is a flowchart illustrating an example of operation of the image processing apparatus.

FIG. 6 is a flowchart illustrating an example of operation of the image processing apparatus 1.

Firstly, a user of the image processing apparatus 1 operates the operation unit 13 to prepare for FAX transmission.

The image processing apparatus 1 starts receiving a FAX transmission request in accordance with a user operation (S1; Yes). The image processing apparatus 1 receives selection or input of the telephone number of a transmission destination, and prompts the user to place the document 2 to be faxed in a document feeder of the optical scanning unit 14.

The user selects or inputs the telephone number of the transmission destination, places the document 2 in the document feeder, and operates the operation unit 13 to cause the optical scanning unit 14 to read the document 2.

The optical-scanning controller 100 of the image processing apparatus 1 sets the document reading settings such as resolution, size, and color/black-and-white settings for the optical scanning unit 14 on the basis of the optical-scanning setting information 111, and controls the optical scanning unit 14 by using the settings to read the document 2 (S2). In this case, for example, default document reading settings of a resolution of 400 dpi, a size of A4, and a black-and-white setting have been set in the optical-scanning setting information 111. Note that as the optical-scanning setting information 111, factory default information set in advance, information set by the user, or information set on the basis of the acquired communication quality of the network 5 may be used.

The optical scanning unit 14 reads the document 2, generates the document-image information 112, and stores the document-image information 112 in the memory 11 (S3).

(2) Preview Operation

Next, the document-image preview displaying unit 101 generates multiple types of preview images of the document-image information 112 generated as a result of reading the document 2 with the optical scanning unit 14, the preview images each having different transmission settings such as resolution, size, and color/black-and-white settings (S4). The document-image preview displaying unit 101 displays the multiple types of preview images on the display 12 (S5). In this case, the document-image preview displaying unit 101 does not change the settings of, for example, a size of A4 and a black-and-white setting. The document-image preview displaying unit 101 generates preview images having resolutions of 200 dpi and 100 dpi, respectively, changed from 400 dpi, and displays the preview images on the display 12. The settings are changed in order to reduce a data amount of the image information by decreasing the resolution. However, if a data amount is not a consideration, the resolution may be increased by using an image interpolation technique.

Figure 3:
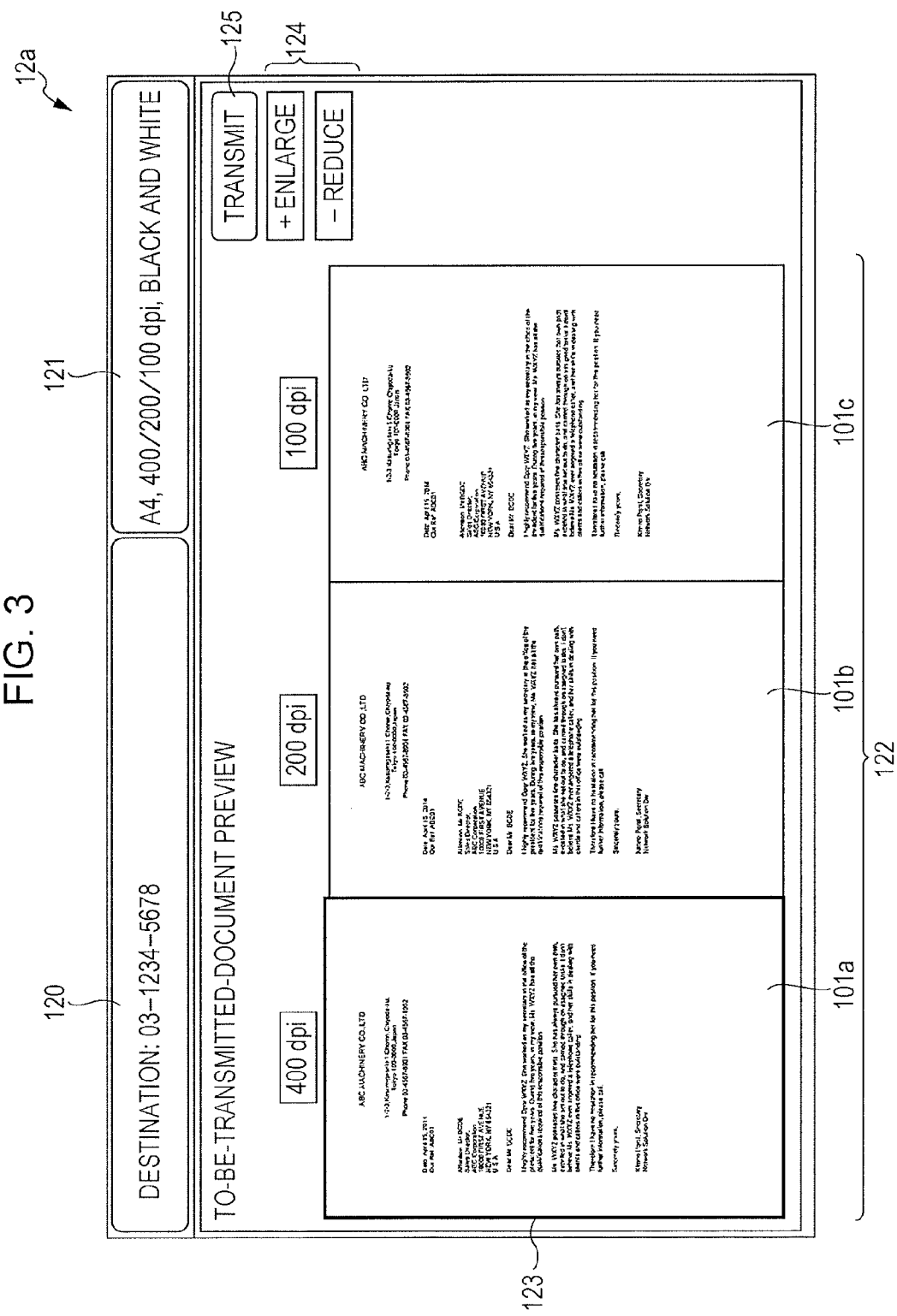
FIG. 3 is a schematic diagram illustrating an example of a configuration of a preview display screen displayed on a display by a document-image preview displaying unit.

FIG. 3 is a schematic diagram illustrating an example of a configuration of a preview display screen displayed on the display 12 by the document-image preview displaying unit 101.

A preview display screen 12*a* includes a destination region 120 that displays the telephone number or the like of a transmission destination, a setting region 121 that displays the transmission settings of the preview images, a preview image displaying region 122 in which preview images 101*a* to 101*c* are displayed, a selection frame 123 for selecting one of the preview images 101*a* to 101*c*, an enlarge/reduce button 124 for enlarging or reducing the display of the preview images 101*a* to 101*c*, and a transmission button 125 for transmitting an image in accordance with the settings of the preview image selected by using the selection frame 123.

The user checks the preview display screen 12*a*, and operates the operation unit 13 in the following manner. The user selects one of the preview images 101*a* to 101*c* that has a resolution that the user considers to be appropriate, by using the selection frame 123, and presses the transmission button 125. In this case, for example, the preview image 101*b* having a resolution of 200 dpi is selected.

(3) FAX Transmission Operation

Next, upon receipt of the operation of selecting one of the preview images 101*a* to 101*c* (S6; Yes), the to-be-transmitted-image generating unit 102 generates the to-be-transmitted-image information 113 from the document-image information 112 on the basis of the transmission settings of the selected preview image (S7). In the example described above, the to-be-transmitted-image generating unit 102 generates new to-be-transmitted-image information 113 having a resolution of 200 dpi on the basis of the transmission settings of the document-image information 112. Note that if the user requests a transmission setting of a resolution exceeding 400 dpi, the processing may return to step S2 in order to read the document 2 again by using new reading settings.

The FAX communication controller 103 controls the FAX communication unit 16 to transmit the to-be-transmitted-image information 113 to a destination in the destination information 114 or a destination inputted by the user through the operation unit 13 (S8).

Other Exemplary Embodiments

Note that the exemplary embodiment of the invention is not limited to the aforementioned exemplary embodiment, and various modifications may be made without departing from the scope of the exemplary embodiment of the invention. For example, the setting to be changed may be size.

Figure 4:
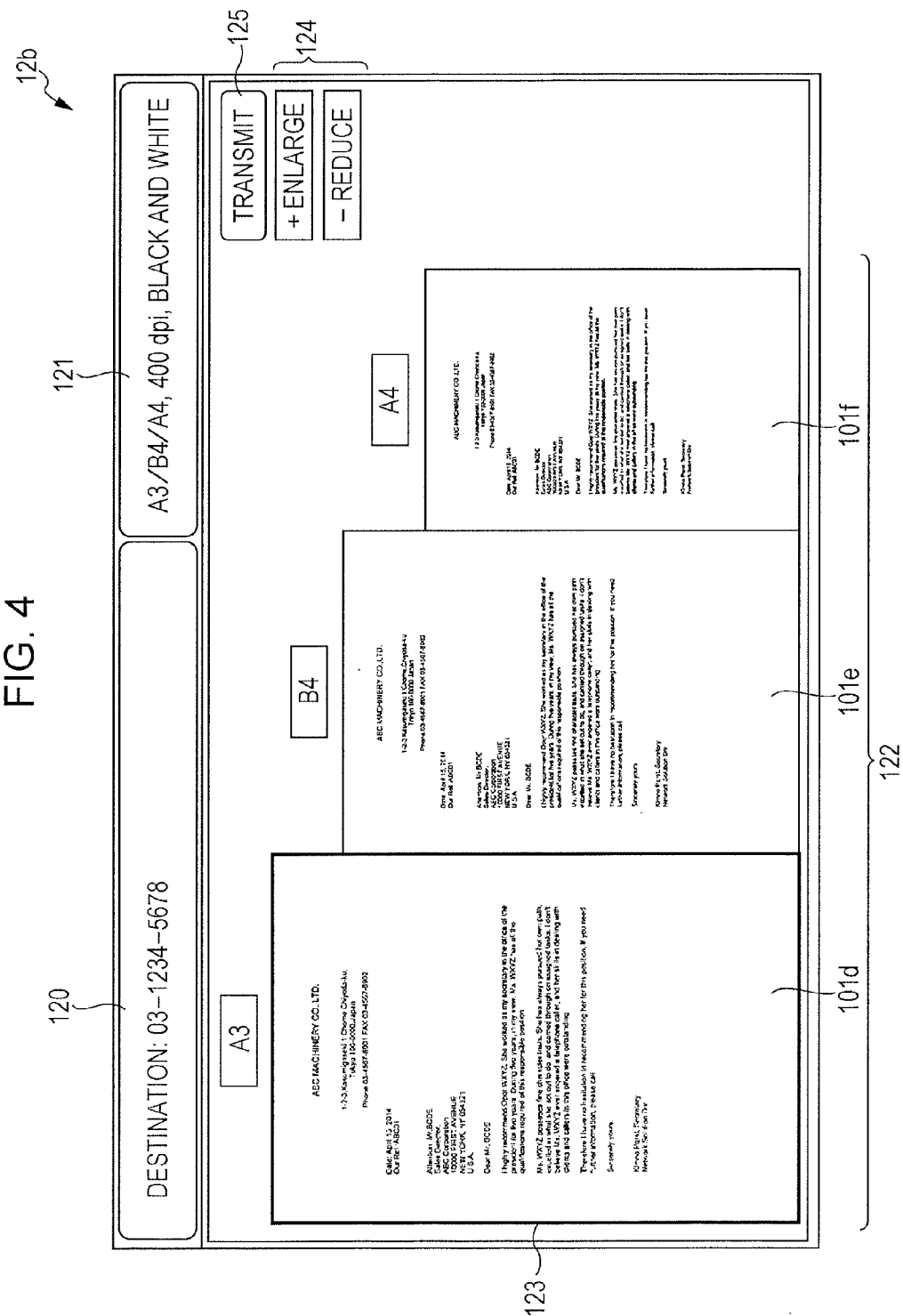
FIG. 4 is a schematic diagram illustrating another example of the configuration of the preview display screen displayed on the display by the document-image preview displaying unit.

FIG. 4 is a schematic diagram illustrating another example of the configuration of the preview display screen displayed on the display 12 by the document-image preview displaying unit 101.

A preview display screen 12b includes the destination region 120, the setting region 121, the preview image displaying region 122, the selection frame 123, the enlarge/reduce button 124, and the transmission button 125.

The user checks the preview display screen 12b, and operates the operation unit 13 in the following manner. The user selects one of the preview images that has a size that the user considers to be appropriate by using the selection frame 123, and presses the transmission button 125.

The preview images may also be displayed on the display of the tablet terminal 3.

Figure 5:
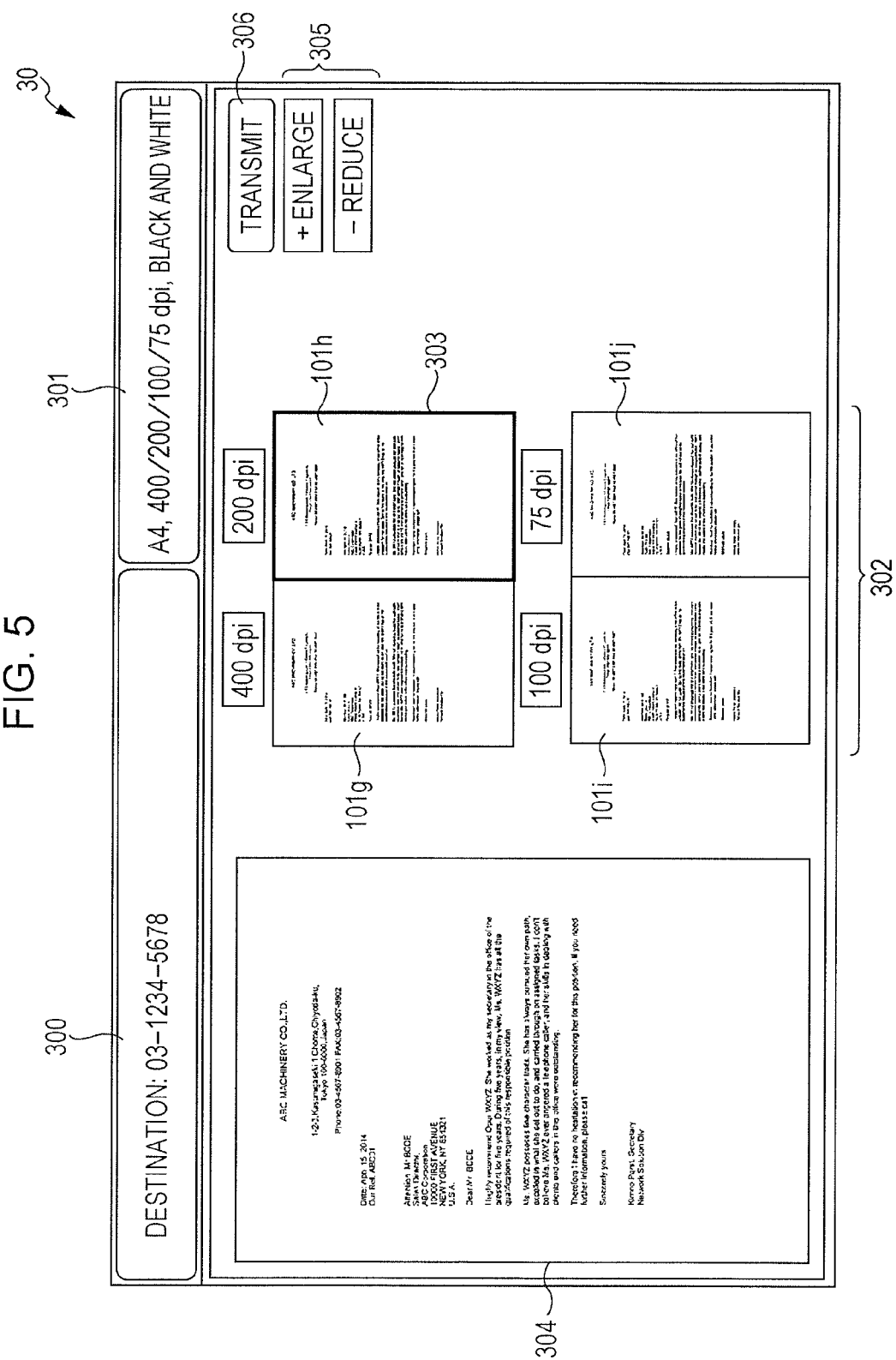
FIG. 5 is a schematic diagram illustrating an example of a configuration of a preview display screen displayed on a display of a tablet terminal by the document-image preview displaying unit.

FIG. 5 is a schematic diagram illustrating an example of a configuration of a preview display screen displayed on the display of the tablet terminal 3 by the document-image preview displaying unit 101.

A preview display screen 30 includes a destination region 300 that displays the telephone number or the like of a transmission destination; a setting region 301 that displays the transmission settings of preview images; a preview image displaying region 302 in which preview images 101g to 101j are displayed; a selection frame 303 for selecting one of the preview images 101g to 101j; an enlarged/reduced display region 304 in which one of the preview images 101g to 101j selected by using the selection frame 303 is displayed in an enlarged manner; an enlarge/reduce button 305 for changing the enlargement ratio used for displaying the preview images 101g to 101j; and a transmission button 306 for transmitting an image by using the transmission settings used for the preview image selected by using the selection frame 303.

The user checks the preview display screen 30, and operates a touch panel serving as an operation unit of the tablet terminal 3 in the following manner. The user selects one of the preview images 101g to 101j that has a resolution that the user considers to be appropriate by using the selection frame 303, and presses the transmission button 306.

The preview images are displayed on the display of the tablet terminal 3, and thereby the preview images are enabled to be displayed in more detail than in the case of being displayed on the display 12 of the image processing apparatus 1. This also allows selection of a preview image through the tablet terminal 3, eliminating the need for an operation through the operation unit 13.

The description of the case of FAX transmission in the exemplary embodiments has heretofore been given. However, as long as image information generated by optical scanning is handled, the exemplary embodiments of the invention are also be applicable to cases of copying and transmitting the image information attached to an e-mail.

An example has heretofore been described in which the multiple preview images are displayed in each of the preview display screens 12a, 12b, and 30. However, each of preview images may be displayed one by one in a switching manner in accordance with a user operation.

The foregoing image processing program 110 may be provided in such a manner as to be stored in a storage medium such as a compact disc read-only memory (CD-ROM), or may be downloaded from a server apparatus or the like connected to a network such as the Internet, to a memory in the image processing apparatus. In addition, some or all of the optical-scanning controller 100, the document-image preview displaying unit 101, the to-be-transmitted-image generating unit 102, and the FAX communication controller 103 may be implemented by hardware such as an application specific integrated circuit (ASIC). Note that changing the order of steps, omissions, and additions may be made to steps in the operation description in the aforementioned exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for image processing, the process comprising:

performing preview display processing to simultaneously display a plurality of preview images of a page of content of document-image information generated by optically scanning a document according to one reading setting, wherein each preview image of the plurality of preview images is displayed in accordance with a different transmission setting from among a plurality of transmission settings; and generating new image information in a case where a first preview image among the plurality of preview images is selected by a user, the new image information being generated according to a transmission setting that corresponds to the first preview image selected by the user.

2. The non-transitory computer readable medium according to claim 1, wherein
the plurality of transmission settings are set by changing the one reading setting stepwise.

3. The non-transitory computer readable medium according to claim 1, wherein
the one reading setting is included in the plurality of transmission settings.

4. The non-transitory computer readable medium according to claim 2, wherein
the one reading setting is included in the plurality of transmission settings.

5. The non-transitory computer readable medium according to claim 1, wherein each transmission setting from among the plurality of transmission settings corresponds to a different resolution of the piece of content of document-image information.

6. The non-transitory computer readable medium according to claim 1, wherein a plurality of preview images of the page of content of document-image information is displayed on a screen, and each preview image of the plurality of preview images corresponds to a different resolution of the page of content of document-image information.

7. An image processing apparatus comprising:
   a preview displaying unit configured to perform display processing to simultaneously display a plurality of preview images of a page of content of document-image information generated by optically scanning the document with an optical scanning unit according to one reading setting, wherein each preview image of the plurality of preview images is displayed in accordance with a different transmission setting from among a plurality of transmission settings; and
   a generating unit configured to generate new image information in a case where a first preview image among the plurality of preview images is selected by a user, the new image information being generated according to a transmission setting that corresponds to the first preview image selected by the user.

8. An image processing method comprising:
   performing preview display processing to simultaneously display a plurality of preview images of a page of content of document-image information generated by optically scanning the document according to one reading setting, wherein each preview image of the plurality of preview images is displayed in accordance with a different transmission setting from among a plurality of transmission settings; and
   generating new image information in a case where a first preview image among the plurality of preview images is selected by a user, the new image information being generated according to a transmission setting that corresponds to the first preview image selected by the user.

9. A non-transitory computer readable medium storing a program causing a computer to execute a process for image processing, the process comprising:
   performing preview display processing to display a plurality of preview images of a page of content of document-image information generated by optically scanning a document according to one reading setting, wherein each preview image of the plurality of preview images is displayed in accordance with a different transmission setting from among a plurality of transmission settings and is displayed one by one in a switching manner in accordance with a user operation; and
   generating new image information in a case where a first preview image among the plurality of preview images is selected by a user, the new image information being generated according to a transmission setting that corresponds to the first preview image selected by the user.

* * * * *